United States Patent
Kudo et al.

(10) Patent No.: US 8,014,606 B2
(45) Date of Patent: Sep. 6, 2011

(54) IMAGE DISCRIMINATION APPARATUS

(75) Inventors: Daiki Kudo, Tokyo (JP); Hirofumi Nishikawa, Tokyo (JP); Yoshiaki Kato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 782 days.

(21) Appl. No.: 11/991,606

(22) PCT Filed: Jun. 16, 2006

(86) PCT No.: PCT/JP2006/312144
§ 371 (c)(1),
(2), (4) Date: Mar. 7, 2008

(87) PCT Pub. No.: WO2007/049378
PCT Pub. Date: May 3, 2007

(65) Prior Publication Data
US 2009/0116751 A1 May 7, 2009

(30) Foreign Application Priority Data
Oct. 25, 2005 (JP) ................................. 2005-310157

(51) Int. Cl.
*G06K 9/00* (2006.01)
(52) U.S. Cl. .................................................. 382/181
(58) Field of Classification Search .......... 382/181–231, 382/298, 305
See application file for complete search history.

(56) References Cited

U.S. PATENT DOCUMENTS 6,393,054 B1 * 5/2002 Altunbasak et al. .......... 375/240
6,928,233 B1 8/2005 Walker et al.
2002/0047936 A1 * 4/2002 Tojo .............................. 348/700

FOREIGN PATENT DOCUMENTS

| JP | 2000-285242 A | 10/2000 |
| JP | 2004-112678 A | 4/2004 |
| WO | WO 2005/050986 A1 | 6/2005 |

OTHER PUBLICATIONS

Nikkei Electronics, No. 892, 2005, pp. 51.
Nakajima et al., "Shot Change Detection from Partially Decoded MPEG Data," Institute of Electronics, Information and Communication Engineers Paper Magazine, vol. J81-D-II, No. 7, 1998, pp. 1564-1575.
Moriyama et al., "Video Summarization Based on the Psychological Unfolding of a Drama," Institute of Electronics, Information and Communication Engineers Paper Magazine, vol. J84-D-II, No. 6, 2001, pp. 1122-1131.
Guo et al., "Video Shot Segmentation of the Partitioned Histogram Based on Automatic Threshold Detection" Computer Engineer NG & Science, vol. 27, No. 8 (2005).

* cited by examiner

*Primary Examiner* — Phuoc Tran
*Assistant Examiner* — Alex Liew
(74) *Attorney, Agent, or Firm* — Birch, Stewart, Kolasch & Birch, LLP.

(57) ABSTRACT

An image discrimination apparatus includes an inter-frame distance calculating unit 2 for calculating an inter-frame distance which is a distance between features from the feature of a current frame extracted by a feature extracting unit 1 and the feature of an immediately-preceding frame stored in a feature buffer 3, and a cut-point-determination data calculating unit 4 for calculating statistics values of inter-frame distances and calculating a threshold for determination of cut points from the statistics values. The image discrimination apparatus compares the inter-frame distance of the current frame with the threshold for determination of cut points to determine a cut point from the comparison result.

3 Claims, 4 Drawing Sheets

IMAGE DISCRIMINATION APPARATUS

FIELD OF THE INVENTION

The present invention relates to an image discrimination apparatus which discriminates an image in an important section from a video signal.

BACKGROUND OF THE INVENTION

There has been proposed an image discrimination apparatus which divides an image signal into parts in units of each shot by detecting cut points of the image, and which discriminates an important shot from the plurality of shots.

As a process of detecting cut points, there is a method of detecting, as cut points, points at each of which the brightness of the image changes between adjacent frames and the difference in the brightness between the frames is larger than a fixed threshold, as disclosed by, for example, the following nonpatent reference 1.

Furthermore, as disclosed in the following nonpatent reference 2, there is a method of evaluating a difference between frames using an evaluation function and detecting, as cut points, points at each of which the difference between frames is larger than a threshold which is preset by learning other image contents.

[Nonpatent reference 1] Nikkei electronics No. 892 2005.1.31, pp. 51

[Nonpatent reference 2] "Shot Change Detection from Partially Decoded MPEG Data", the Institute of Electronics, Information and Communication Engineers paper magazine Vol. J81-D2 No. 7 (July, 1998), written by Yasuyuki Nakajima, Kiyono Ujihara, Akio Yoneyama, published by the Institute of Electronics, Information and Communication Engineers, pp. 1564 to 1575.

Because the conventional image discrimination apparatuses are constructed as mentioned above, while points at each of which the brightness of the image changes between adjacent frames and the difference in the brightness between frames is larger than a fixed threshold are detected as cut points, a problem is that because the threshold is fixed even though any kind of image signal is inputted, the accuracy of the detection of cut points degrades.

Another problem is that because in the case of using the threshold which is preset by learning other image contents, the learned results change according to the contents which are learning objects, cut points cannot be correctly detected unless the contents which are applied to an image signal inputted are learned, and therefore the method cannot be used for general purposes.

The present invention is made in order to solve the above-mentioned problems, and it is therefore an object of the present invention to provide an image discrimination apparatus which can detect cut points correctly even when any kind of image signal is inputted.

DISCLOSURE OF THE INVENTION

An image discrimination apparatus in accordance with the present invention includes: a distance calculating means for calculating a distance between features from a feature currently extracted by the feature extracting means and a feature extracted last time by the feature extracting means; and a threshold calculating means for calculating a statistics value of distances between features which have been calculated by the distance calculating means, and for calculating a threshold for determination of cut points from the statistics value, and the image discrimination apparatus compares the distance between features calculated by the distance calculating means with the threshold calculated by the threshold calculating means to determine a cut point from a result of the comparison.

Because the image discrimination apparatus in accordance with the present invention includes: the distance calculating means for calculating the distance between features from the feature currently extracted by the feature extracting means and the feature extracted last time by the feature extracting means; and the threshold calculating means for calculating the statistics value of distances between features which have been calculated by the distance calculating means, and for calculating the threshold for determination of cut points from the statistics value, and the image discrimination apparatus compares the distance between features calculated by the distance calculating means with the threshold calculated by the threshold calculating means to determine a cut point from the result of the comparison, there is provided an advantage of being able to detect cut points correctly even when any kind of image signal is inputted.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
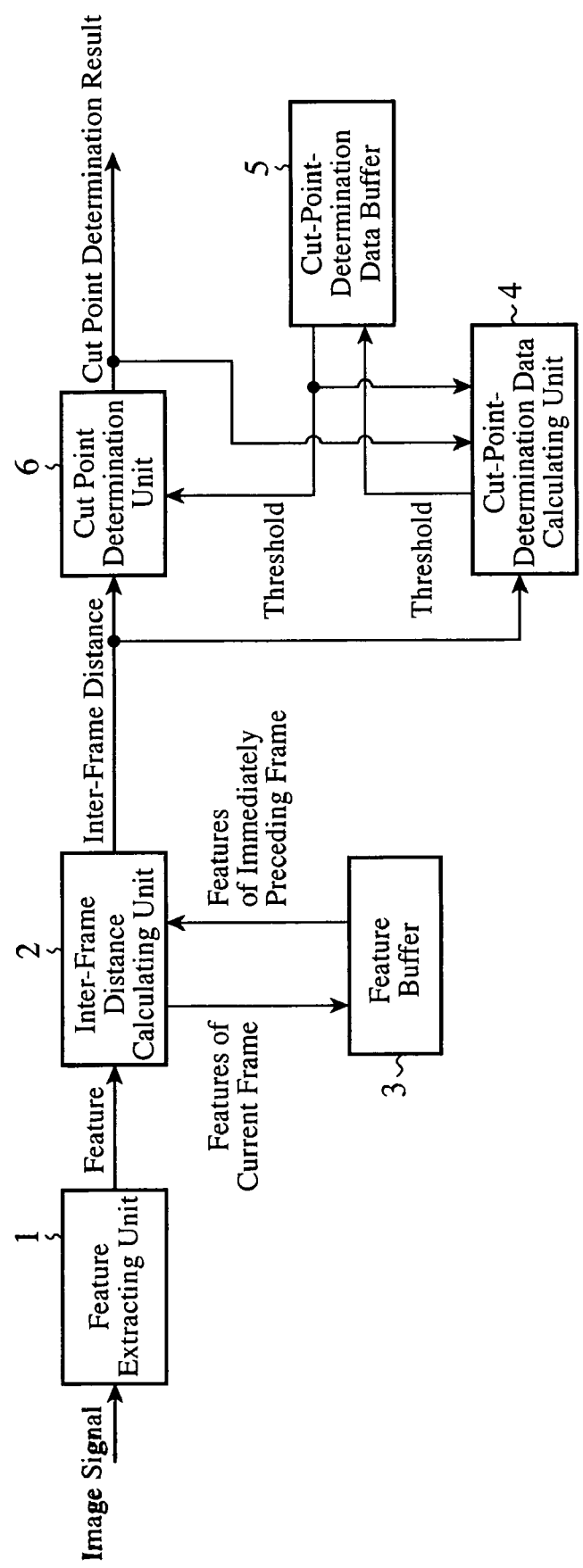
FIG. 1 is a block diagram showing an image discrimination apparatus in accordance with Embodiment 1 of the present invention.

FIG. 1 is a block diagram showing an image discrimination apparatus in accordance with Embodiment 1 of the present invention. In the figure, a feature extracting unit 1 carries out a process of, when receiving an image signal, extracting a feature indicating a feature of an image frame from the image signal. The feature extracting unit 1 constructs a feature extracting means.

An inter-frame distance calculating unit 2 carries out a process of comparing a feature of a current frame currently extracted by the feature extracting unit 1 with a feature of an immediately-preceding frame stored in the feature buffer 3 (i.e., the feature of the frame which was extracted the last time by the feature extracting unit 1) using a predetermined evaluation function, and calculating the distance between those features (i.e., the degree of dissimilarity between them). Hereafter, the distance between the feature of the current frame and that of the immediately-preceding frame is referred to as "the inter-frame distance."

After the feature buffer 3 stores the feature of the immediately-preceding frame and the inter-frame distance calculating unit 2 then calculates the inter-frame distance, in order to prepare for calculation of the next inter-frame distance, the feature buffer 3 replaces the feature of the immediately-preceding frame which it is storing currently with the feature of the current frame which has been extracted by the feature extracting unit 1.

A distance calculation means is comprised of the inter-frame distance calculating unit 2 and the feature buffer 3.

A cut-point-determination data calculating unit 4 carries out a process of calculating statistics values of inter-frame distances which have been calculated by the inter-frame distance calculating unit 2, calculating a threshold for determination of cut points from the statistics values, and outputting the threshold for determination of cut points to a cut-point-determination data buffer 5.

The cut-point-determination data buffer 5 is a memory for storing the threshold for determination of cut points which is calculated by the cut-point-determination data calculating unit 4.

A threshold calculating means is comprised of the cut-point-determination data calculating unit 4 and the cut-point-determination data buffer 5.

A cut point determination unit 6 carries out a process of comparing the inter-frame distance calculated by the inter-frame distance calculating unit 2 with the threshold for determination of cut points which is stored in the cut-point-determination data buffer 5 so as to determine a cut point from the comparison result. The cut point determination unit 6 constructs a cut point determining means.

Figure 3:
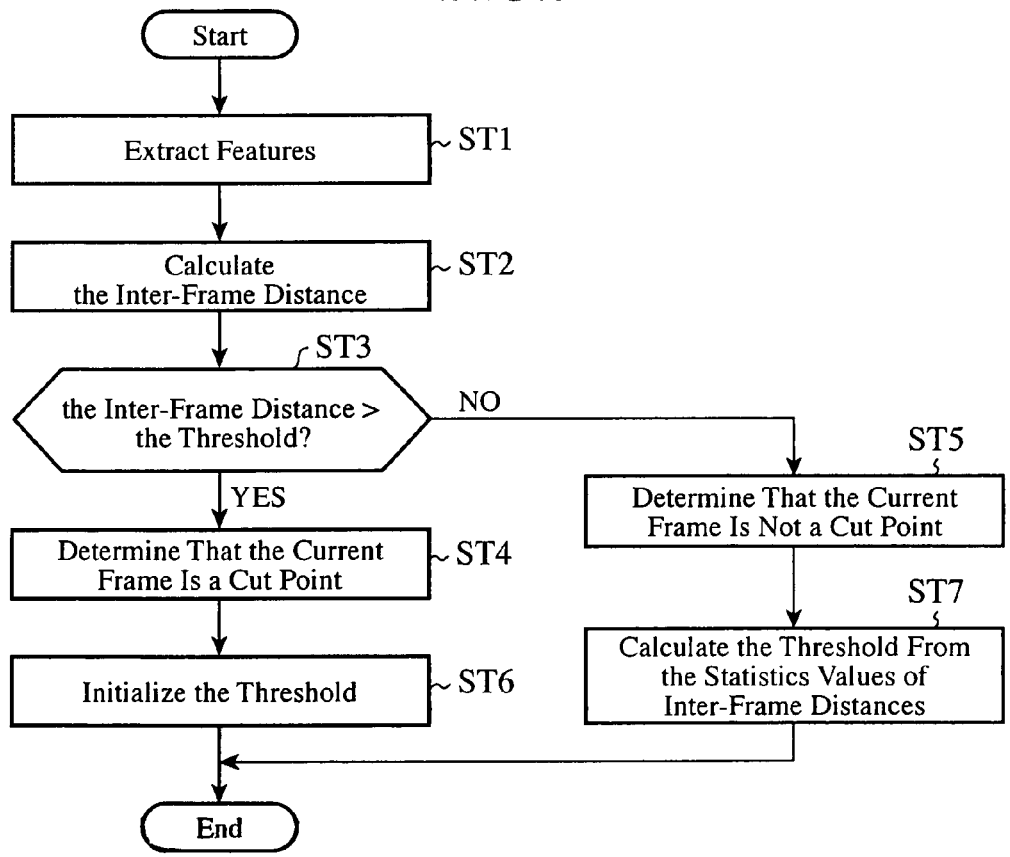
FIG. 3 is a flow chart showing processing carried out by the image discrimination apparatus in accordance with Embodiment 1 of the present invention.

FIG. 3 is a flow chart showing processing carried out by the image discrimination apparatus is shown in accordance with Embodiment 1 of the present invention.

Next, the operation of the image discrimination apparatus will be explained.

When receiving an image signal, the feature extracting unit 1 extracts a feature indicating a feature of a frame from the image signal (step ST1).

As the feature indicating the feature of a frame, a histogram of colors, arrangement information about colors, texture information, motion information, or the like, other than the difference between the current frame and the preceding frame, can be provided. Either one of these features can be used, or a combination of two or more of the features can be used.

When the feature extracting unit 1 extracts the feature of the current frame, the inter-frame distance calculating unit 2 reads out the feature of the immediately-preceding frame (i.e., the feature of the frame which was extracted the last time by the feature extracting unit 1) from the feature buffer 3.

The inter-frame distance calculating unit 2 then compares the feature of the current frame with feature of the immediately-preceding frame using the predetermined evaluation function, and calculates the inter-frame distance which is the distance (the degree of dissimilarity) between those features (step ST2).

The inter-frame distance calculating unit 2 replaces the memory content of the feature buffer 3 with the feature of the current frame after calculating the inter-frame distance.

When the inter-frame distance calculating unit 2 calculates the inter-frame distance, the cut point determination unit 6 compares the inter-frame distance with the threshold for determination of cut points which is stored in the cut-point-determination data buffer 5 (step ST3).

When the inter-frame distance is larger than the threshold for determination of cut points, the cut point determination unit 6 determines that the frame is a cut point, and outputs the determination result showing that the frame is a cut point (step ST4).

In contrast, when the inter-frame distance is not larger than the threshold for determination of cut points, the cut point determination unit determines that the frame is not a cut point, and outputs the determination result showing that the frame is not a cut point (step ST5).

In this case, the cut point determination unit 6 determines a cut point using the threshold for determination of cut points. As an alternative, the cut point determination unit 6 can determine a cut point using, for example, a shot time or the like.

The determination result outputted from the cut point determination unit 6 is information showing whether or not the frame is a cut point. Therefore, for example, a user or an exterior program can use the determination result when editing the image content, making a digest playback of the image, or the like.

The cut-point-determination data calculating unit 4 initializes the memory content of the cut-point-determination data buffer 5 to a predetermined value when the determination result of the cut point determination unit 6 shows that the frame is a cut point (step ST6).

In contrast, when the determination result of the cut point determination unit 6 shows that the frame is not a cut point, the cut-point-determination data calculating unit calculates the statistics values of inter-frame distances which have been calculated by the inter-frame distance calculating unit 2, calculates the threshold for determination of cut points from the statistics values, and replaces the memory content of the cut-point-determination data buffer 5 with the threshold (step ST7).

Concretely, the cut-point-determination data calculating unit calculates the threshold for determination of cut points as follows.

An actual image content consists of a plurality of shots, and it is hard to consider that a frame immediately after a cut which is a break between shots is a cut point and it can be considered that a shot includes a plurality of continuous frames. Hereafter, for the sake of convenience in explanation, the distance between the (n−1)-th frame and the n-th frame of each shot is expressed as $Dist_n$.

It can be considered that the n-th frame of the i-th shot is actually the first frame of the (i+1)-th shot when this distance $Dist_n$ is larger than the threshold. More specifically, it can be considered that the n-th frame of the i-th shot is a cut point. In this case, assume that the first frame of the i-th shot is the 0th frame. Furthermore, assume that the above-mentioned threshold is changed adaptively, and the threshold is expressed as $Th_{i\_n}$.

When calculating the threshold $Th_{i\_n}$, the cut-point-determination data calculating unit 4 calculates an average $avg_i(Dist_n)$ of the distances between frames in the i-th shot, and also calculates a variance $var_i(Dist_n)$ of the distances between frames.

After calculating the average $avg_i(Dist_n)$ of the distances and the variance $var_i(Dist_n)$ of the distances, the cut-point-determination data calculating unit 4 calculates the threshold $Th_{i\_n}$ by substituting the average $avg_i(Dist_n)$ of the distances and the variance $var_i(Dist_n)$ of the distances into the following equation (1).

$$Th_{i\_n} = avg_i(Dist_n) + \alpha \cdot var_i(Dist_n) \tag{1}$$

In the equation (1), $\alpha$ is a coefficient.

The average $avg_i(Dist_n)$ and the variance $var_i(Dist_n)$ are not the average and variance of the distances of all the frames in the i-th shot, but are the average and variance of the distances of the 1st to (n−1)-th frames in the i-th shot.

The reason why the 1st and subsequent frames are used for the calculation of the average and variance of the distances without using the 0th frame for the calculation of the average and variance of the distances is that the distance $Dist_0$ about the 0th frame shows the inter-frame distance between the 0th frame and the last frame of the immediately-preceding shot.

Furthermore, the reason why up to the (n−1)-th frame is used for the calculation of the average and variance of the distances without using the n-th frame for calculation of the average and variance of the distances is that the cut-point-determination data calculating unit can determine promptly whether or not the inputted frame is a cut point.

The average $avg_i(Dist_n)$ and the variance $var_i(Dist_n)$ do not need to be accurate values, and certain approximate values can be used as them. The coefficient α can be changed according to the genre of the content, or the like.

As can be seen from the above description, the image discrimination apparatus in accordance with this embodiment 1 includes the inter-frame distance calculating unit 2 for calculating an inter-frame distance which is a distance between features from a feature of a current frame extracted by the feature extracting unit 1 and a feature of an immediately-preceding frame stored in the feature buffer 3, and the cut-point-determination data calculating unit 4 for calculating statistics values of inter-frame distances which have been calculated by the inter-frame distance calculating unit 2, and calculating a threshold for determination of cut points from the statistics values. The image discrimination apparatus compares the inter-frame distance calculated by the inter-frame distance calculating unit 2 with the threshold for determination of cut points calculated by the cut-point-determination data calculating unit 4, and determines whether or not the current frame is a cut point from the comparison result. Therefore, this embodiment offers an advantage of being able to detect cut points correctly even when any kind of image signal is inputted.

More specifically, even when there is a motion in a shot, the image discrimination apparatus according to this Embodiment 1 can discriminate a cut point from a variation in the motion by analyzing the motion statistically, and can therefore set up the threshold for determination of cut points adaptively. As a result, as compared with a conventional case in which a fixed threshold is used, the image discrimination apparatus can improve the accuracy of the detection of cut points. The reason is as follows.

In accordance with the conventional method, a change in the brightness value in a frame is used for detection of a cut point, and the threshold for detection of cut points is a fixed value.

In general, it is difficult to predict whether a shot will come after the current shot.

In a case in which similar shots continue, for example, in a case in which the image is created by changing cameras in the same studio, even a cut point may have a small change in the brightness value.

In contrast, in a case in which there is, for example, a flash or a person's large motion even in the same cut, a larger change (a large change in the brightness value) may appear between frames.

Figure 2:
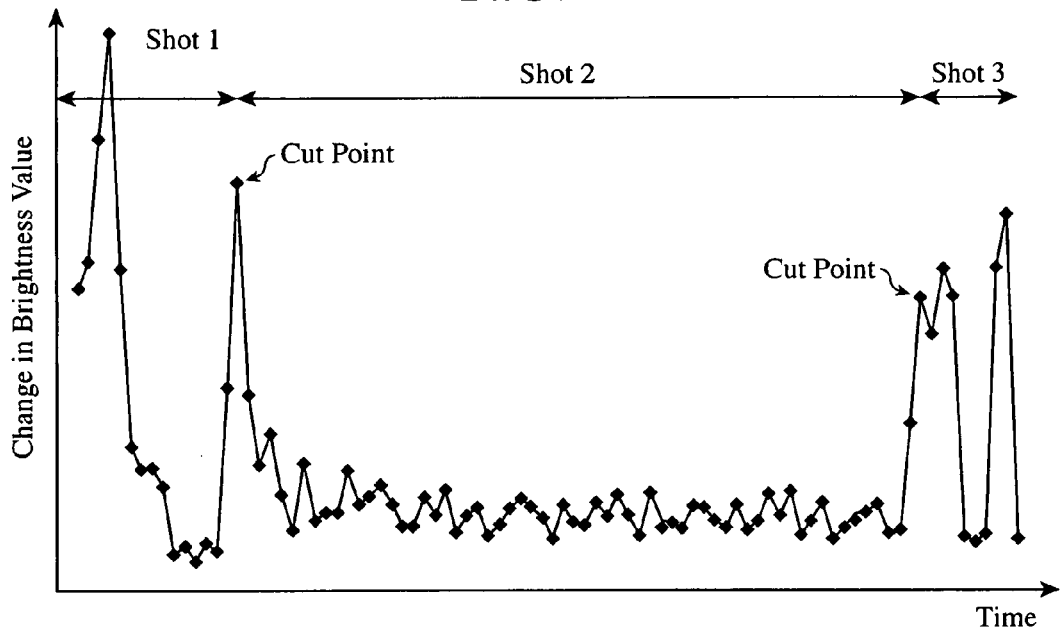
FIG. 2 is an explanatory drawing showing change in a brightness value and cut points.

FIG. 2 is an explanatory drawing showing a change in the brightness value in such a case.

Therefore, in accordance with the conventional method, a setup of a large threshold causes an oversight of cut points having a small change, while a setup of a small threshold causes an erroneous detection of cut points in a shot having large variations.

In contrast with this, in accordance with this Embodiment 1, the use of features in addition to a simple difference in the brightness value improves the general purpose characteristic of the apparatus. Furthermore, when a frame has a large distance which is an evaluation result of the evaluation function, it is determined that it is a cut point, and, by setting up the threshold adaptively, the threshold becomes large automatically for a shot having large variations, whereas the threshold becomes small automatically for a shot having small variations. Therefore, a large improvement in the accuracy of the detection of cut points and an improvement in the general purpose characteristic of the apparatus can be expected.

In this Embodiment 1, when extracting a feature, the feature can be extracted not from the image signal, but from coded data about the image compressed.

Furthermore, when calculating the inter-frame distance, the image discriminating apparatus does not necessarily calculate it from the features of two adjacent frames, but can calculate the inter-frame distance between the features of two frames spaced two or more frames, thereby speeding up the calculation processing.

When thus calculating the inter-frame distance between the features of two frames spaced two or more frames and then detecting cut points, the image discriminating apparatus can use frames using intra-frame coding in a coded image which is compressed with respect to time.

Furthermore, when calculating the average and variance of distances, the image discriminating apparatus can carry out a process of assigning a weight to a frame which is close to the current frame, and so on, to deal with a temporal change in variations in each shot.

Embodiment 2

Figure 4:
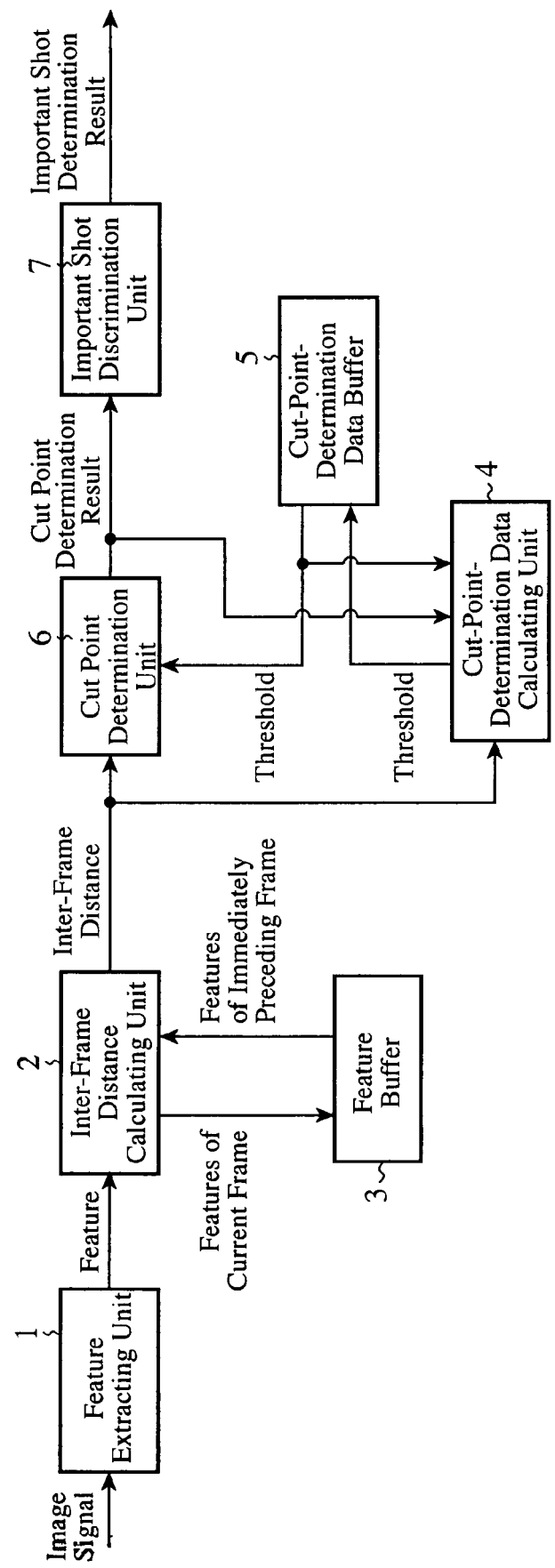
FIG. 4 is a block diagram showing an image discrimination apparatus in accordance with Embodiment 2 of the present invention.

FIG. 4 is a block diagram showing an image discrimination apparatus in accordance with Embodiment 2 of the present invention. In the figure, because the same reference numerals as those shown in FIG. 1 denote the same components or like components, the explanation of these components will be omitted hereafter.

When the determination result of the cut point determination unit 6 shows that the current frame is a cut point, an important shot discrimination unit 7 carries out a process of determining whether or not a shot starting from a cut point immediately preceding the above-mentioned cut point (the immediately-preceding cut point is the one which was determined the last time by the cut point determination unit 6) is an important shot. The important shot discrimination unit 7 constructs an important shot discriminating means.

Figure 5:
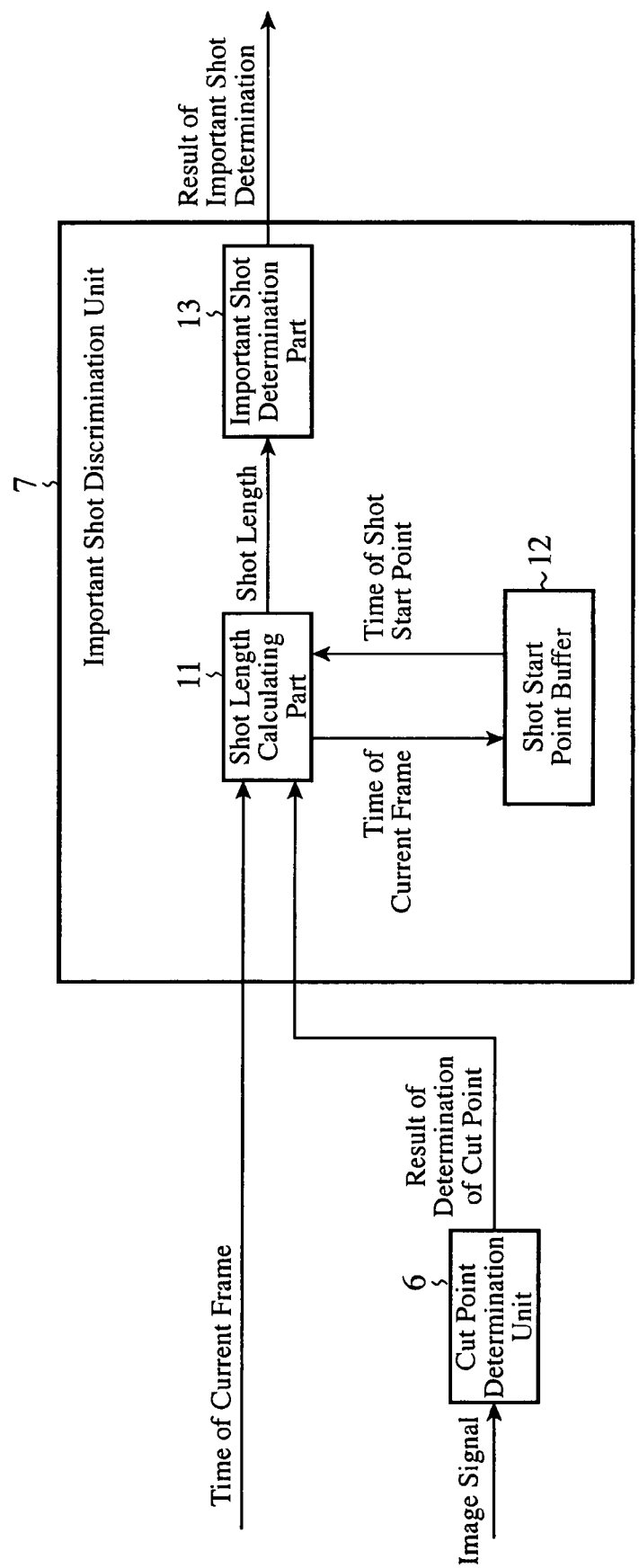
FIG. 5 is a block diagram showing an important shot discrimination unit of the image discrimination apparatus in accordance with Embodiment 2 of the present invention.

FIG. 5 is a block diagram showing the important shot discrimination unit 7 of the image discrimination apparatus in accordance with Embodiment 2 of the present invention. In the figure, when the determination result of the cut point determination unit 6 shows that the current frame is a cut point, a shot length calculating part 11 carries out a process of calculating the time difference between the time of the current frame and the time of a shot start point stored in a shot start point buffer 12, and outputting, as a shot length, the time difference to an important shot determination part 13.

The shot start point buffer 12 is a memory for storing the time of the shot start point.

When the shot length calculated by the shot length calculating unit 11 is longer than a preset threshold, the important shot determination part 13 carries out a process of determining that the shot starting from the preceding cut point immediately preceding the cut point determined by the cut point determination unit 6 is an important shot, the next shot next to the shot starting from the preceding cut point is an important shot, or the shot starting from the preceding cut point and the next shot are important shots, and then outputting the determination result.

Next, the operation of the image discrimination apparatus will be explained.

When the inter-frame distance calculating unit 2 calculates the inter-frame distance, the cut point determination unit 6 compares the inter-frame distance with the threshold for determination of cut points which is stored in the cut-point-determination data buffer 5, like that of above-mentioned Embodiment 1.

When the inter-frame distance is larger than the threshold for determination of cut points, the cut point determination unit 6 determines that the current frame is a cut point, and outputs the determination result showing that the current frame is a cut point to the important shot discrimination unit 7.

In contrast, when the inter-frame distance is not larger than the threshold for determination of cut points, the cut point determination unit determines that the current frame is not a cut point, and outputs the determination result shows that the current frame is not a cut point to the important shot discrimination unit 7.

When the determination result of the cut point determination unit 6 shows that the current frame is not a cut point, the important shot discrimination unit 7 does not carry out any processing especially, whereas when the determination result of the cut point determination unit 6 shows that the current frame is a cut point, the important shot discrimination unit determines whether or not a shot starting a preceding cut point immediately preceding the cut point is an important shot.

More specifically, because the shot length calculating part 11 of the important shot discrimination unit 7 can acquire the shot length of the shot from the difference between the start time of the i-th shot and the start time of the (i+1)-th shot, when the determination result of the cut point determination unit 6 shows that the current frame is a cut point, the shot length calculating part calculates the time difference between the time of the current frame and the time of the shot start point stored in the shot start point buffer 12, and outputs, as the shot length, the time difference to the important shot determination part 13.

After calculating the shot length, the shot length calculating part 11 replaces the memory content of the shot start point buffer 12 with the time of the current frame.

After the shot length calculating unit 11 calculates the shot length, the important shot determination part 13 of the important shot discrimination unit 7 compares the shot length with the preset threshold.

When the shot length is longer than the preset threshold, the important shot determination part 13 then determines that the shot starting from the preceding cut point immediately preceding the cut point determined by the cut point determination unit 6 is an important shot, and outputs the determination result.

In this case, the important shot determination part 13 determines that the shot starting from the preceding cut point immediately preceding the cut point is an important shot. As an alternative, the important shot determination part can determine that the next shot next to the shot starting from the immediately preceding cut point is an important shot, or can determine that both the shot starting from the immediately preceding cut point and the next shot are important shots.

As can be seen from the above description, because the image discrimination apparatus in accordance with this embodiment 2 is so constructed as to, when the determination result of the cut point determination unit 6 shows that the current frame is a cut point, determine whether or not a shot starting from a cut point immediately preceding the current point is an important shot. Therefore, the present embodiment offers an advantage of making it possible for the user to grasp important shots easily without causing any increase in the calculation load by carrying out very complicated processes, such as processes using many image processing methods and processes using a voice processing method.

This Embodiment 2 is based on the fact that in a case in which the image is a content principally consists of a conversation scene, the shot length of an important narration or a speech included in the conversation scene is long. Furthermore, in a case in which cut points are known, the image discrimination apparatus is characterized in that its calculation load is dramatically small, and therefore the image discrimination apparatus can carry out determination of an important shot even if it has a low calculation capability.

When determining cut points, the image discrimination apparatus can speed up the processing using frames apart from each other instead of using adjacent frames. Also in this case, the start time of an important shot outputted deviates from the original start time of the important shot by a small time.

INDUSTRIAL APPLICABILITY

As mentioned above, the image discrimination apparatus in accordance with the present invention is used when discriminating an image of an important section from an image signal, and is suitable for when performing image discrimination with a high degree of accuracy of detection of cut points.

The invention claimed is:

1. An image discrimination apparatus comprising:
   a feature extracting unit to extract a feature indicating a feature of an image from an image signal;
   a distance calculating unit to calculate a distance between features from a feature currently extracted by said feature extracting unit and a feature extracted last time by said feature extracting unit;
   a threshold calculating unit to calculate a statistics value of distances between features which have been calculated by said distance calculating unit, and for calculating a threshold for determination of cut points from the statistics value; and
   a cut point determining unit to compare the distance between features calculated by said distance calculating unit with the threshold calculated by said threshold calculating unit to determine a cut point from a result of the comparison, wherein
   the threshold for determination of cut points is calculated based on an equation:

$$Th_{i\_n} = avg_i(Dist_n) + \alpha * var_i(Dist_n)$$

where $avg_i(Dist_n)$ is an average of the distances, $\alpha$ is a coefficient, and $var_i(Dist_n)$ is the variance of the distances.

2. The image discrimination apparatus according to claim 1, further comprising an important shot determining unit for, when a cut point is determined by the cut point determining unit, determining whether or not a shot starting from a cut point immediately preceding said cut point is an important shot.

3. The image discrimination apparatus according to claim 1, wherein the coefficient $\alpha$ varies based on content of the image.

* * * * *